US011628342B2

United States Patent
Song et al.

(10) Patent No.: US 11,628,342 B2
(45) Date of Patent: Apr. 18, 2023

(54) MULTI-SPORT SENSING SYSTEM

(71) Applicant: CODE REACH CORP., Seoul (KR)

(72) Inventors: Jin Woo Song, Yongin-si (KR); Kwang Ha Eun, Paju-si (KR)

(73) Assignee: CODE REACH CORP., Seoul (KR)

( * ) Notice: Subject to any disclaimer, the term of this patent is extended or adjusted under 35 U.S.C. 154(b) by 230 days.

(21) Appl. No.: 17/049,678

(22) PCT Filed: Apr. 22, 2019

(86) PCT No.: PCT/KR2019/004830
§ 371 (c)(1),
(2) Date: Oct. 22, 2020

(87) PCT Pub. No.: WO2019/208990
PCT Pub. Date: Oct. 31, 2019

(65) Prior Publication Data
US 2021/0236895 A1    Aug. 5, 2021

(30) Foreign Application Priority Data
Apr. 23, 2018 (KR) .................. 10-2018-0046805

(51) Int. Cl.
*A63B 63/00* (2006.01)
*A63B 69/36* (2006.01)

(52) U.S. Cl.
CPC ............ *A63B 63/004* (2013.01); *A63B 69/36* (2013.01); *A63B 2220/803* (2013.01); *A63B 2220/806* (2013.01); *A63B 2220/807* (2013.01); *A63B 2220/833* (2013.01)

(58) Field of Classification Search
CPC . A63B 63/004; A63B 69/36; A63B 2220/803; A63B 2220/806; A63B 2220/807; A63B 2220/833; A63B 63/00; G06V 20/40; G06V 40/23
See application file for complete search history.

(56) References Cited

U.S. PATENT DOCUMENTS

2011/0129210 A1\* 6/2011 McGucken .......... G03B 17/561
705/26.5

FOREIGN PATENT DOCUMENTS

| CZ | 30387 U1 \* | 1/2017 |
|---|---|---|
| JP | 2002-369903 A | 12/2002 |
| KR | 10-1237053 B1 | 2/2013 |
| KR | 10-2013-0047081 A | 5/2013 |
| KR | 2013047081 A \* | 5/2013 |
| KR | 10-2015-0025668 A | 3/2015 |
| KR | 20-2015-0001268 U | 4/2015 |

OTHER PUBLICATIONS

Korean Intellectual Property Office Notification of Reason for Refusal for KR 10-2018-0046805 dated Mar. 12, 2019.
International Search Report for PCT/KR2019/004830 dated Aug. 9, 2019 [PCT/ISA/210].

\* cited by examiner

*Primary Examiner* — Jeffrey S Vanderveen
(74) *Attorney, Agent, or Firm* — Sughrue Mion, PLLC

(57) ABSTRACT

The present invention relates to a system for sensing multi-sports, and includes a central column, a sliding column provided to be able to enter and exit the longitudinal valley, and a first bracket provided with a first sensing camera unit connected to an upper end of the sliding column. The present invention may be used for simulation of several ball games.

7 Claims, 5 Drawing Sheets

(a)  (b)  (c)

MULTI-SPORT SENSING SYSTEM

CROSS-REFERENCE TO RELATED APPLICATION

This application claims priority from Korean Patent Application No. 10-2018-0046805 filed on Apr. 23, 2018 in the Korean Intellectual Property Office, and all the benefits accruing therefrom under 35 U.S.C. 119, the contents of which in their entirety are herein incorporated by reference.

BACKGROUND

1. Technical Field

The present invention relates to a system for sensing, and more particularly, to a system for sensing multi-sports capable of providing simulations for various ball games.

2. Description of the Related Art

A simulation system refers to the study of a real or virtual dynamic system model using a computer, and is also called a simulation or copy. With the recent increase in the leisure population, the number of users who practice using various sports simulation devices or seek fun by themselves is increasing rapidly.

Leisure life expanded and national income increased. Accordingly, golf, which was considered exclusively for the wealthy in the past, has spread in the form of screen golf. Therefore, it is becoming a popular sport that anyone may enjoy. In addition, simulation devices related to outdoor sports such as baseball and tennis have been developed one after another and are gaining popularity.

If such a simulation system is properly used, it is expected that it may be used in physical education activities in schools to enhance the learning effect. However, simulation devices for golf, baseball, or the like are specialized devices for the sport and require precise measurement. Therefore, most of them are fixed, and there are restrictions on using them as mobile.

SUMMARY

A system for sensing multi-sports according to an embodiment of the present invention aims to provide a simulation for various ball game sports while being portable.

The object of the present invention is not limited to those mentioned above. Other objects not mentioned will be clearly understood by those of ordinary skill in the art from the following description.

A system for sensing multi-sports according to an aspect of the present invention for solving the technical problem described above includes: a central column; a sliding column provided to be able to enter and exit the longitudinal valley; and a first bracket provided with a first sensing camera unit connected to an upper end of the sliding column.

In addition, the system may further include a second bracket provided with a second sensing camera unit connected to one end of the first bracket.

In addition, a motion camera unit is provided on one side of the central column, in which a focus direction of a motion camera included in the motion camera unit may be provided such that the first bracket faces a direction extending from the sliding column.

In addition, the central column further includes a laser pointing unit, in which a laser irradiated from the laser pointing unit may be provided to point to a specific point in a plane perpendicular to the focus direction of the first camera unit.

In addition, a sliding groove in a vertical direction is formed on a side of the central column, in which the sliding column may be provided with a protruding guide provided to be slidable along the sliding groove.

In addition, the first bracket may include a guide to allow the first sensing camera to move in a longitudinal direction of the first bracket.

In addition, a rotation driving unit may be provided at one end of the first bracket to allow the second bracket to form a predetermined angle with the first bracket.

In addition, it may include a control unit for controlling the guide or the rotation driving unit so that the focus direction of the first sensing camera and the focus direction of the second sensing camera face a specific point on the same plane.

A system for sensing multi-sports according to an embodiment of the present invention is portable and may provide simulations for various ball game sports.

The benefit of the present invention is not limited to those mentioned above. Other benefits not mentioned will be clearly understood by those of ordinary skill in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
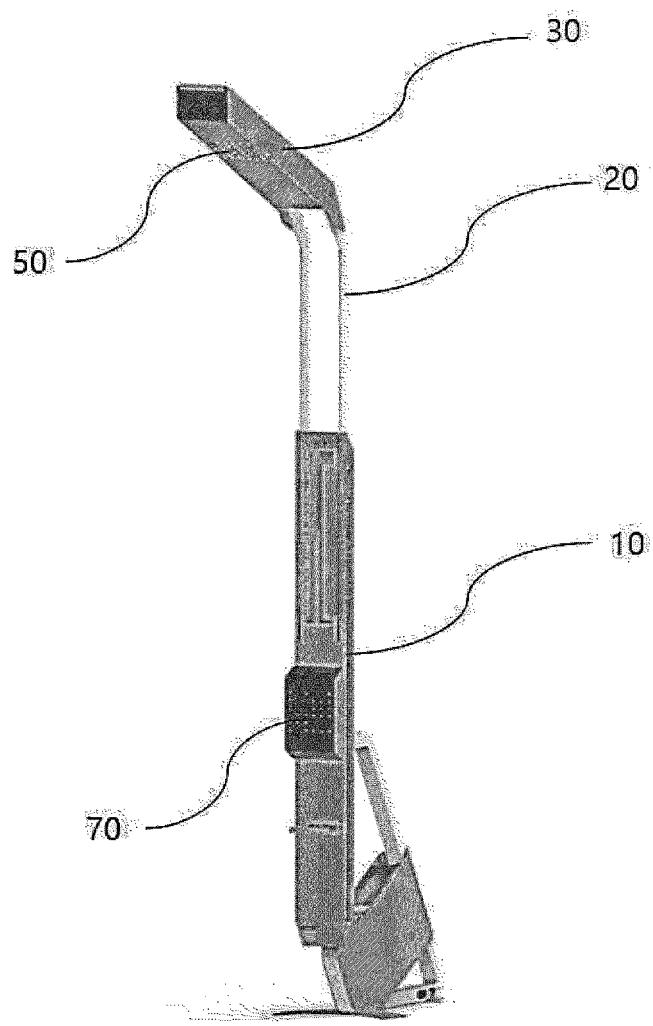
FIG. 1 is a view illustrating a system for sensing multi-sports according to an embodiment of the present invention.

Objects and effects of the present invention, and technical configurations for achieving them will become apparent with reference to embodiments described later in detail together with the accompanying drawings. In the following description of the present disclosure, a detailed description of known functions and configurations will be omitted if it is determined that the gist of the present disclosure may be unnecessarily blurred. In addition, the terms to be described later are terms defined in consideration of donation in the present invention, and may vary depending on the intention or custom of users or operators.

However, the present invention is not limited to embodiments disclosed below, and may be implemented in various different forms. The present embodiments are provided merely to complete the disclosure of the present invention, and to fully inform the scope of the present invention to those of ordinary skill in the art. The present invention is defined by the scope of the claims. Therefore, the definition should be made based on the contents throughout the specification.

Throughout the specification, when a part "includes" or "has" a certain component, this means that other components may not be excluded, and other components may be further included unless otherwise stated. In addition, the terms such as " . . . unit," " . . . part," "module," or the like described in the specification mean a unit that processes at least one function or operation, and it may be implemented in hardware or software or a combination of hardware and software.

In an embodiment of the present invention, each component, functional blocks, or means may include one or more sub-components. Electrical, electronic, and mechanical functions performed by each component may be implemented with various known devices or mechanical elements such as electronic circuits, integrated circuits, and application specific integrated circuits (ASICs). Each of them may be implemented separately or two or more may be integrated into one.

In an embodiment of the present invention, a user device refers to all calculation means that may collect, read, handle, process, store, and display data such as desktop computers, notebook computers, smartphones, PDAs, mobile phones, or the like. In particular, in an embodiment of the present invention, a user device is a device that may execute software written in readable code, and has a function of displaying and delivering it to a user. In addition, it may either store software itself or read it with data from outside, if necessary.

In addition, in an embodiment of the present invention, a terminal includes not only data processing functions described above but also input, output, and storage functions. To this end, it may include various elements such as a CPU, a main board, a graphic card, a hard disk, a sound card, a speaker, a keyboard, a mouse, a monitor, a USB, a communication modem, etc. of general computer devices, and a CPU, a main board, a graphic chip, a memory chip, a sound engine, a speaker, a touch pad, an external connection terminal such as USB, a communication antenna of wireless smartphone terminals, a communication modem that may implement communication such as 3G, LTE, LTE-A, Wi-Fi, Bluetooth, etc. These various elements may be used alone or in combination of two or more, or a portion of various elements may be combined to implement one or more functions. In an embodiment of the present invention, devices or parts thereof indicated by one or more blocks in the drawings or detailed description may mean that various elements included in the user equipment as described above are singly or two or more are combined or a part of various elements are combined to represent one or more functions.

Hereinafter, a system for sensing multi-sports according to an embodiment of the present invention will be described in detail with reference to the accompanying drawings.

FIG. 1 is a view illustrating a system for sensing multi-sports according to an embodiment of the present invention. Referring to FIG. 1, the system for sensing multi-sports according to the embodiment of the present invention includes a central column 10 with a longitudinal valley formed inside, a sliding column 20 provided to be able to enter and exit the longitudinal valley, a first bracket 30 provided with a first sensing camera unit 50 connected to an upper end of the sliding column 20.

Referring to FIG. 1, the central column 10 may have a valley formed therein so that the sliding column 20 is inserted to allow entry and exit. For light weight for convenience of movement, in the system for sensing multi-sports according to the embodiment of the present invention, a sliding groove 11 in a vertical direction is formed on a side of the central column 10, and the sliding column 20 may be provided with a protruding guide 31 provided to be slidable along the sliding groove 11.

Figure 2:
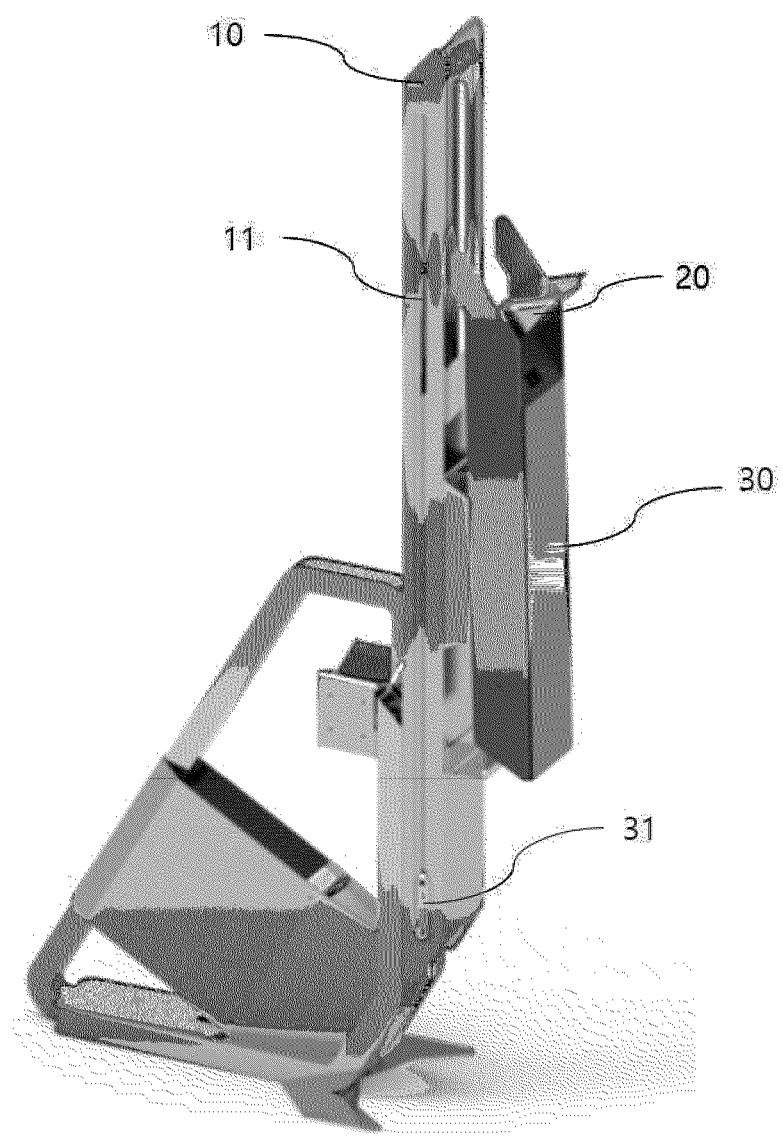
FIG. 2 is a view showing a folded state to carry the system for sensing multi-sports according to the embodiment of the present invention.
Figure 3:
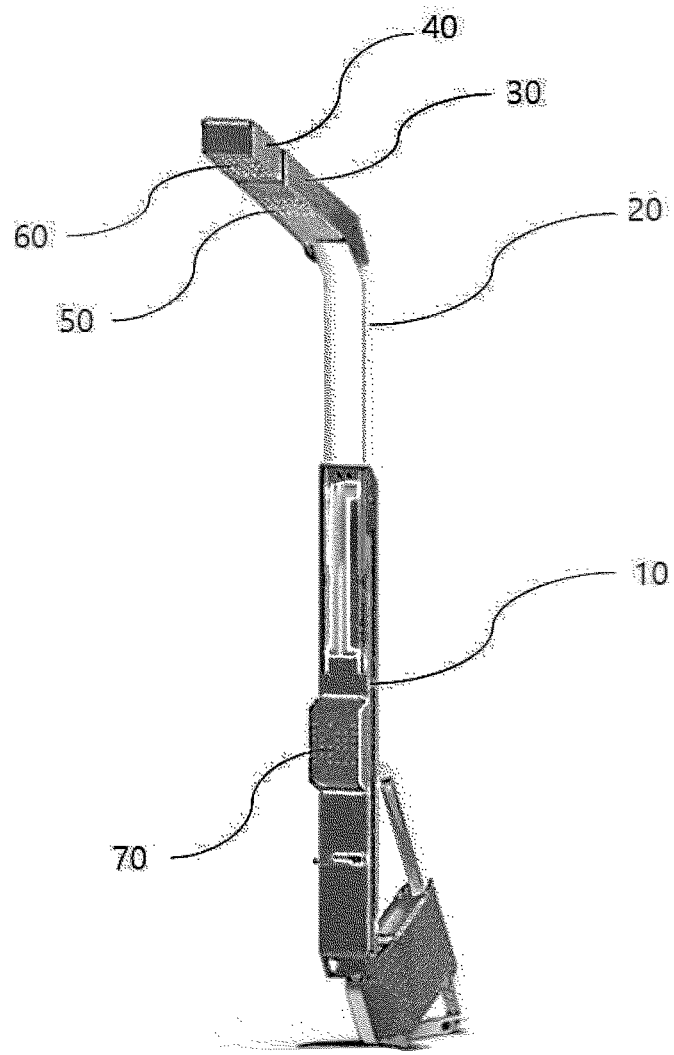
FIG. 3 illustrates a system for sensing multi-sports according to another embodiment of the present invention.

FIG. 2 is a view showing a folded state to carry the system for sensing multi-sports according to the embodiment of the present invention. Referring to FIG. 2, in order to increase portability, in the system for sensing multi-sports according to the embodiment of the present invention, the sliding column 20 is inserted into the valley of the central column 10, and the first bracket 30 is formed to be in close contact with the central column 10 to be folded.

Since the system for sensing multi-sports according to the embodiment of the present invention may be easily moved and installed, it may be used for baseball, soccer, etc. for enjoying outdoors.

The upper end of the sliding column is provided to support the first bracket 30 provided with the first sensing camera unit 50. The upper end of the sliding column may be provided in a bent shape so as to distribute a load of the connected first bracket 30 and to be suitable for a folding structure.

Next, the first bracket 30 may be provided with the first sensing camera unit 50 capable of sensing a ball located below. The first sensing camera is provided to photograph a hitting scene for the sensed ball (e.g., a soccer ball, a baseball ball, a golf ball, etc.). The hitting scene may be a continuous image by a high-speed camera or may be photographed in the form of a video. Continuous images or videos collected by a motion camera may be provided to be transmitted to a user in real time. To this end, the system for sensing multi-sports according to the embodiment of the present invention may include a data storage and a data transmission/reception unit.

Next, in the system for sensing multi-sports according to the embodiment of the present invention, the slide column may be adjusted up and down so that a ball may be obtained as an image of the same size.

Figure 4:
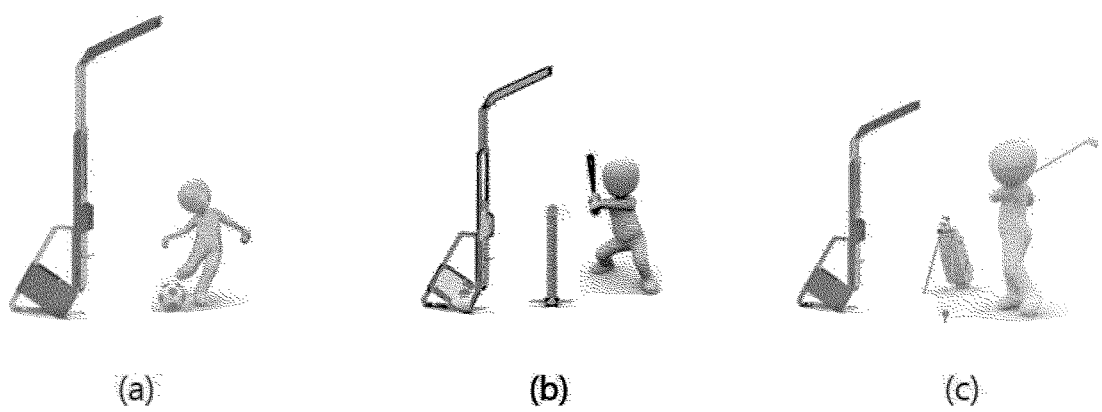
FIG. 4 is an exemplary view for using a system for sensing multi-sports according to an embodiment of the present invention for simulation of soccer, baseball, and golf.

FIG. 4 is an exemplary view for using a system for sensing multi-sports according to an embodiment of the present invention for simulation of soccer, baseball, and golf. When described with reference to FIG. 4, (a) illustrates the case of hitting a soccer ball, (b) illustrates the case of hitting a baseball ball, and (c) illustrates the case of hitting a golf ball. In the case of a soccer ball and a golf ball, the ball is hit while it is laid on the ground. In the case of a baseball ball, the ball is hit while it is placed on a stand that may hold the ball. A sensing camera collects an image including a moment of hitting the ball.

Referring to the drawings, it may be seen that heights of the bracket provided with the sensing camera unit are different in each case. In other words, the sliding column 20 may move up and down so that the sensing camera unit distinguishes each ball and recognizes an image of the same size. By this, it may be used for simulation of various sports using minimum sensing cameras.

In order to more accurately analyze a ball's three-dimensional trajectory, a system for sensing multi-sports according to another embodiment of the present invention may further comprise a second bracket 40 provided with a second sensing camera unit 60 connected to one end of the first bracket 30.

Focus directions of the first sensing camera unit 50 and the second sensing camera unit 60 may be adjusted to face a ball that may be located below. The focus direction of each sensing camera provided in the first sensing camera unit 50 and the second sensing camera unit 60 may be provided to face a direction perpendicular to a longitudinal direction of the first bracket 30 and the second bracket 40.

A position where focuses of the first sensing camera provided in the first sensing camera part 50 and the second sensing camera provided in the second sensing camera part 60 cross may be changed according to a height of the sliding column 20. According to the embodiment of the system for sensing multi-sports, in the case of golf or soccer where a ball is hit by placing it on the ground, a height of the sliding column is adjusted to capture the same image size of the ball. In this case, in order to accurately match a focus to the ball, the first bracket 30 may include a guide that allows the first sensing camera unit 50 to move in the longitudinal direction of the first bracket 30.

For example, when an angle formed by the first bracket 30 and the second bracket 40 is fixed, a position at which the focus matches may be adjusted by moving a position of the first sensing camera unit 50 provided in the first bracket 30 to or away from the second sensing camera unit 60.

As another example, in order to accurately match the focuses of the first sensing camera unit 50 and the second sensing camera unit 60 to the ball, it is possible to adjust the focuses of the first sensing camera and the second sensing camera to match by adjusting angles of the first bracket 30 and the second bracket 40.

For example, when the angle formed by the second bracket 40 and the first bracket 30 changes from a right angle to an obtuse angle, a position in which the focus direction of the second sensing camera provided in the second bracket 40 and the focus direction of the first sensing camera match may be gradually moved away from the first bracket 30. By this principle, it is possible to adjust the position where the focus of each sensing camera matches despite the height of the sliding column 20 moving according to the size of the ball.

Although it is not shown, the system for sensing multi-sports according to the another embodiment of the present invention may include a control unit capable of controlling a rotation drive unit provided at a portion connecting the first bracket 30 and the second bracket 40 or a guide provided inside the first bracket 30 to automatically determine the focuses of the first sensing camera unit 50 and the second sensing camera unit 60.

For example, the control unit may control the guide or the rotation driving unit so that the focus direction of the first sensing camera unit 50 and the focus direction of the second sensing camera unit 60 face a specific point on the same plane.

Next, the system for sensing multi-sports according to the embodiment of the present invention may be moved and installed outdoors. In this case, the ground on which the system for sensing multi-sports is installed or the ground on which the ball is placed may be uneven, or a cross-focus position adjusted by the control unit and a height at which a ball is placed may be different.

Although it is not shown, the system for sensing multi-sports according to the embodiment of the present invention may further include a laser pointing unit capable of adjusting the focus direction of the second sensing camera unit 60 by using a distance to the ground on which an actual ball is placed measured by the first sensing camera unit 50, and enabling visual confirmation of a focus position determined thereby. The laser pointing unit irradiates a laser at a position where a ball is to be placed so that the position where the ball is placed may be easily identified.

The laser pointing unit may be provided on the central column 10, the first sensing camera unit 50, or the second sensing camera unit 60. For example, In the case of the first sensing camera unit 50, a focus direction perpendicular to the ground may be formed. a laser pointing unit that irradiates a laser in the same direction may be installed on the first sensing camera unit 50 to determine a position of a ball.

According to another example, the laser pointing unit may be provided on a side of the central column 10. The laser irradiated from the laser pointing unit may be provided to point to a specific point in a plane perpendicular to the focus direction of the first camera unit.

The laser pointing unit may be attached to one side of the central column 10 to irradiate the laser in a direction in which the focuses of the first sensing camera unit 50 and the second sensing camera unit 60 match. Here, the control unit may be provided to control a driving unit that enables a direction in which the laser pointing unit is directed.

Next, one side of the central column 10 is provided with a motion camera unit 70, in which a focus direction of a motion camera included in the motion camera unit 70 may be provided so that the first bracket 30 faces a direction extending from the sliding column 20.

The motion camera is provided to photograph a motion of a user hitting a ball (e.g., a soccer ball, a baseball ball, a golf ball, etc.) sensed by the first camera unit. The motion of the user may be a continuous image by a high-speed camera or may be photographed in the form of a video. Continuous images or videos collected by a motion camera may be provided to be transmitted to a user in real time. To this end, the system for sensing multi-sports according to the embodiment of the present invention may include a data storage and a data transmission/reception unit.

Figure 5:
FIG. 5 is a view showing a sensing image and a kick motion that captures a moment of hitting a soccer ball analyzed according to the system for sensing multi-sports according to the embodiment of the present invention.
Figure 6:
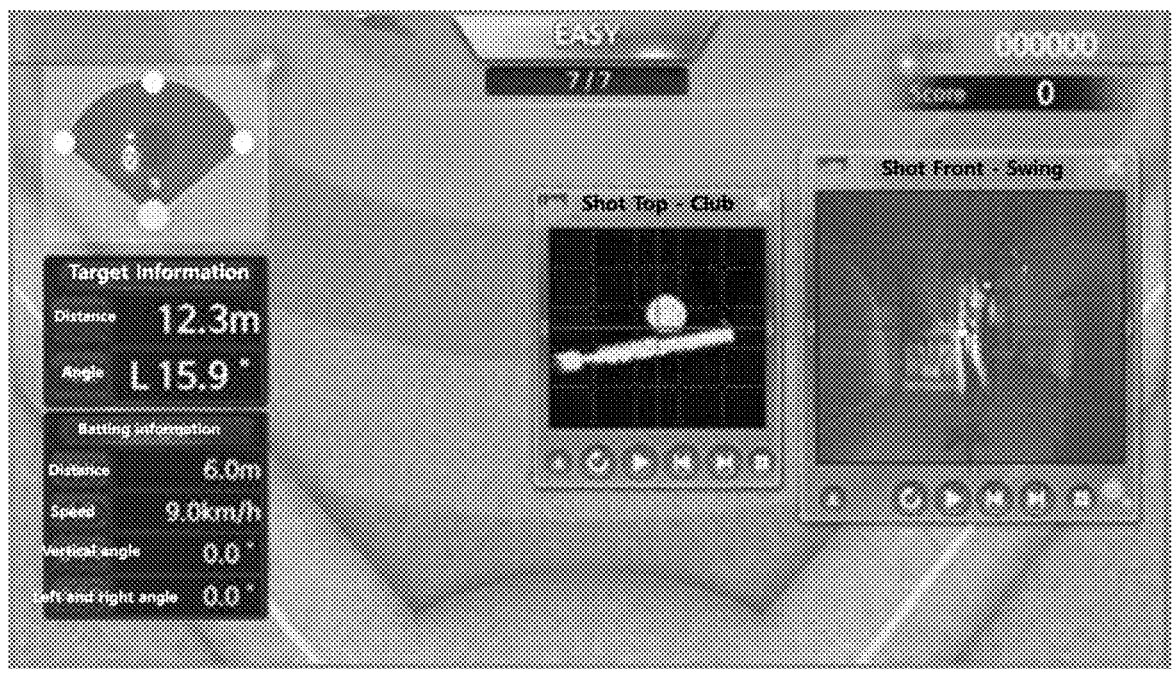
FIG. 6 is a view showing a sensing image and a batting motion that captures a moment of hitting a baseball ball analyzed according to the system for sensing multi-sports according to the embodiment of the present invention.
Figure 7:
FIG. 7 is a view showing a sensing image and a swing motion that capture a moment of hitting a golf ball analyzed according to the system for sensing multi-sports according to the embodiment of the present invention.

FIG. 5 is a view showing a sensing image and a kick motion that captures a moment of hitting a soccer ball analyzed according to the system for sensing multi-sports according to the embodiment of the present invention. FIG. 6 is a view showing a sensing image and a batting motion that captures a moment of hitting a baseball ball analyzed according to the system for sensing multi-sports according to the embodiment of the present invention. FIG. 7 is a view showing a sensing image and a swing motion that capture a moment of hitting a golf ball analyzed according to the system for sensing multi-sports according to the embodiment of the present invention.

Referring to FIGS. 5 to 7, the system for sensing multi-sports according to the embodiment of the present invention may enhance the sports learning effect by photographing a user's hitting motion and providing it to the user.

In the present specification and drawings, preferred embodiments of the present invention are disclosed. Although specific terms have been used, these are merely used in a general meaning to easily describe the technical content of the present invention and to aid understanding of the present invention, and are not intended to limit the scope of the present invention. It will be apparent to those of ordinary skill in the art to which the present invention pertains that in addition to the embodiments disclosed herein, other modifications based on the technical idea of the present invention may be implemented.

| [Reference Numeral] | |
|---|---|
| 10: central column | 20: sliding column |
| 30: first bracket | 40: second bracket |
| 50: first sensing camera unit | 60: second sensing camera unit |
| 70: motion camera unit | |

What is claimed is:

1. A system for sensing multi-sports, comprising:
   a central column with a longitudinal valley formed therein;
   a sliding column provided to be able to enter and exit the longitudinal valley;
   a first bracket provided with a first sensing camera unit connected to an upper end of the sliding column; and
   a control unit for controlling a guide so that a focus direction of a first sensing camera included in the first sensing camera unit and a focus direction of a second sensing camera included in a second sensing camera unit face a specific point on the same plane.

2. The system of claim 1, further comprising:
   a second bracket provided with the second sensing camera unit connected to one end of the first bracket.

3. The system of claim 2, wherein a rotation driving unit is provided at one end of the first bracket to allow the second bracket to form a predetermined angle with the first bracket.

4. The system of claim 1, wherein a motion camera unit is provided on one side of the central column, wherein a focus direction of a motion camera included in the motion camera unit is provided such that the first bracket faces a direction extending from the sliding column.

5. The system of claim 1, wherein the central column further includes a laser pointing unit, wherein a laser irradiated from the laser pointing unit is provided to point to a specific point in a plane perpendicular to the focus direction of the first sensing camera included in the first sensing camera unit.

6. The system of claim 1, wherein a sliding groove in a vertical direction is formed on a side of the central column, and
   wherein the sliding column is provided with a protruding guide provided to be slidable along the sliding groove.

7. The system of claim 1, wherein the first bracket comprises the guide to allow the first sensing camera unit to move in a longitudinal direction of the first bracket.

\* \* \* \* \*